United States Patent [19]

Zoerb

[11] Patent Number: 4,685,748

[45] Date of Patent: Aug. 11, 1987

[54] CONTROL SYSTEM FOR AIRCRAFT WHEEL BRAKES AND METHOD

[75] Inventor: Melvin C. Zoerb, Renton, Wash.

[73] Assignee: The Boeing Company, Seattle, Wash.

[21] Appl. No.: 685,344

[22] Filed: Dec. 24, 1984

[51] Int. Cl.$^4$ .................. B60T 8/42; B64C 25/42
[52] U.S. Cl. .................. 303/115; 137/625.6; 244/111; 303/54
[58] Field of Search ............ 303/116, 114, 115, 117, 303/52, 54; 244/111; 137/625.6

[56] References Cited

U.S. PATENT DOCUMENTS

| | | | |
|---|---|---|---|
| 3,286,734 | 11/1966 | Hartshorne | 303/117 X |
| 3,386,339 | 6/1968 | Selsam | 137/625.6 X |
| 3,443,594 | 5/1969 | Frayer | 303/117 X |
| 3,766,944 | 10/1973 | Distler | 137/625.6 |
| 4,198,102 | 4/1980 | De Vlieg | 303/117 X |

*Primary Examiner*—Duane A. Reger
*Assistant Examiner*—Robert J. Oberleitner
*Attorney, Agent, or Firm*—Delbert J. Barnard

[57] ABSTRACT

The invention provides a system and method for making the braking action more sensitive to pilot control, to provide a smooth stopping response to foot pedal movement by the pilot. A port control member (48) of a first stage metering valve (44) is mechanically connected to a pilot operated foot pedal (50). A pilot applied force on the foot pedal (50) moves the member (48) in a direction causing flow through the valve (44) from a supply pressure to a control pressure chamber in a second stage metering valve (46) to produce a force on a second port control member (76), for moving it in response to foot pedal (50) movement, to meter flow and pressure through the second stage metering valve (46), from a supply pressure to the brake applying device of an aircraft wheel. The output pressure of the first stage metering valve is used as a feedback pressure to move the first stage port control member (48) into a null position in opposition to the foot pedal force. Very little fluid flow through first stage valve (44) is required in order to develop the feedback force. The response to pilot movement of the foot pedal (50) is therefore almost instantaneous.

9 Claims, 6 Drawing Figures

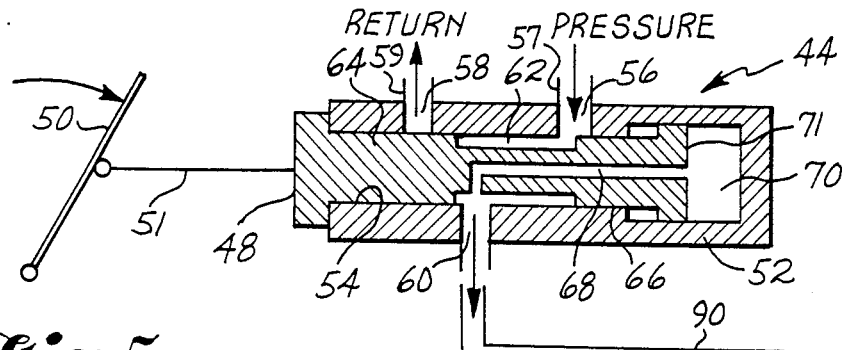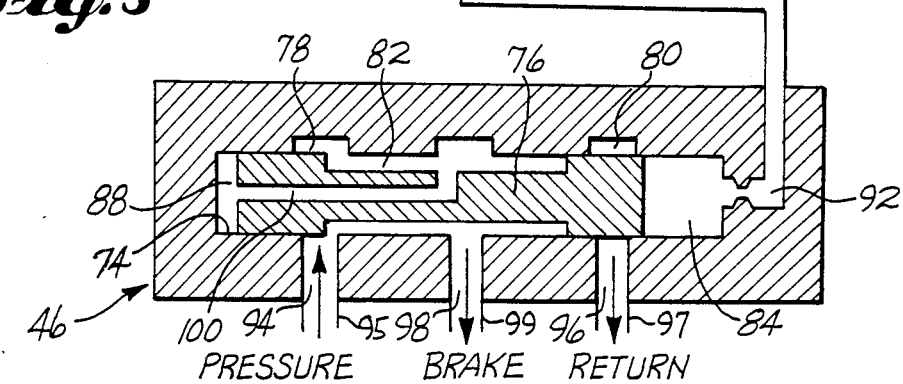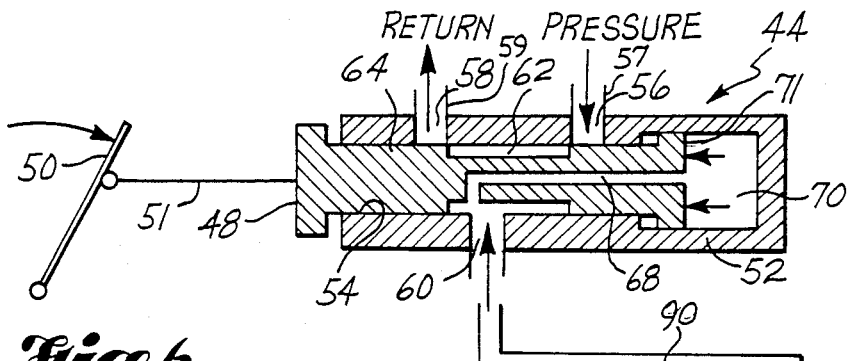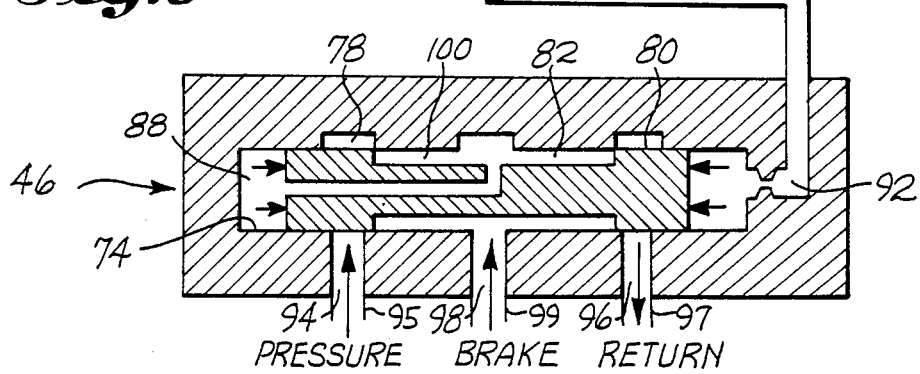

4,685,748

CONTROL SYSTEM FOR AIRCRAFT WHEEL BRAKES AND METHOD

DESCRIPTION

1. Technical Field

This invention relates to the control of hydraulic brakes for aircraft wheels. More particularly, it relates to the provision of a two stage metering valve system, and a control method, adapted to make the braking action more sensitive to pilot control and provide a smooth stopping response to foot pedal movement by the pilot.

2. Background Information

Many modern aircraft, including commercial jet transports manufactured by The Boeing Company of Seattle, Wash., use a simple single stage hydraulic valve to control brake pressure in proportion to the amount of foot pedal load or force applied to the valve by the pilot. In this type of system, the control force applied by the pilot to the brake pedal is transmitted to the valve through a mechanical cable/linkage system. The valve is connected to a hydraulic pressure source so that it can meter flow to the brakes in a controlled fashion in proportion to the displacement of the valve. This type of valve typically contains a feedback chamber which is supplied with the metered pressure output of the valve, i.e. the pressure delivered to the brakes. By this means, the pilot applied force which displaces the port control member of the valve becomes balanced in a closed loop fashion by the metered pressure which is developed as a result of flow through the valve to the brakes. As the feedback pressure (which may also be termed the "brake metered pressure") increases, the valve is driven back to its no flow or null position, against the pilot applied force, to achieve a condition of equilibrium. To release the brakes, the pilot simply relaxes the applied force. The brake pressure feedback force then moves the port control member of the valve back to its off position in which it communicates the brake line with return pressure.

A principal problem with this type of system is that a basic characteristic of aircraft brakes makes the initial application of braking quite difficult. This has been the source of numerous complaints by flight crews and is referred to by the general term of brake sensitivity. Brakes by their very nature must rotate as freely as possible when there is no brake pressure applied to them. This is necessary in order to minimize rolling drag resistance during takeoff and taxi operations which would otherwise reduce airplane performance and generate unnecessary brake heat. In order to minimize this drag, multi-rotor disc brakes are designed with considerable rotor-stator clearances. Springs are generally used to ensure that the brake pistons are retracted when there is no applied brake pressure. This affects the initial operation of the brakes since to develop brake torque the brake pistons must move or stroke through the clearance range until the rotors and stators are in firm contact. At this point the brake torque increases rapidly in response to the brake pressure. During the clearance take up stroke the pressure involved is very low and the fluid flow can be fairly high. This means that the brake metered pressure feedback force is proportionally low as sensed at the brake pedal through the feedback chamber of the brake metering valve. Once the contact point is reached the brake pressure rises rapidly, often generating considerably more brake torque than intended, resulting in a sudden jerky airplane response. While the brake pressure rise is a proportionally large feedback force to the brake pedal, it is generally too late to assist the pilot in making a smooth brake application. This problem is often described as "nonlinear brake sensitivity". That is, as an attempt is made to apply the brakes, the pilot experiences a dead zone range with very little pedal feed force reaction which is followed by a sudden high brake force reaction which in turn gives a jerky airplane stopping response.

This problem with the existing brake control system is more acute for taxi braking situations since the required brake pressures are very low. For instance, most transport airplanes have 3,000 psi hydraulic systems but during taxiing, brake pressures in the range of 400 to 700 psi are sufficient to stop the airplane. Pressures much higher than these values produce excessive brake torques. The 400 to 700 psi brake pressure means that the effective pressure clamping the brake rotors and the stators is approximately 100 to 400 psi since it typically takes about 300 psi to start to compress the return springs. Pressures in this low range are especially difficult to control.

From the point of view of the pilot, if he applies a very light brake pedal force, the brake metering valve is just barely displaced and the flow to the brakes is very low which results in a very long time to fill the brakes to the point that a braking torque is developed. At times in trying to be cautious, he may not apply enough pedal force to overcome the pedal system friction and may not even displace the valve enough to meter fluid, in which case the lack of braking is finally realized and the pilot responds by applying more pedal force.

If the pilot applies too much pedal load from the start, the brake metering valve is opened considerably, resulting in a quite large flow rate to the brakes causing the brakes to fill quickly. This can result in the braking torque developing so rapidly that the airplane jerks abrupty before the pilot can reduce his brake pressure demand.

Often, to handle the brake sensitivity problem, a pilot will resort to a technique of applying a very light brake pedal load in an attempt to just barely close the brake clearance at all times while taxiing. In this manner, he will only need to increase the pedal force slightly to achieve taxi braking. This idea of riding the brakes is very abusive due to the excessive amount of heat that is generated.

3. Disclosure of the Invention

The brake control system of the present invention is basically characterized by a first stage metering valve which includes a port control member that is movable in a brake applying direction by a pilot applied foot pedal force, and a second stage metering valve which is a closed loop servo valve and which includes a valve port controlling member which is forced into a brake applying direction by the pressure output of the first stage valve.

The valve port control member for the second stage includes a pressure port connectable to a supply pressure, a return port connectable to a return pressure, and a brake port connectable to the hydralic unit at the wheel which applies the brakes.

The first stage metering valve includes a pressure port connectable to a supply pressure, a return port connectable to a return pressure, and an output port. The output port is connected to a fluid chamber at a first end of the port control member of the second stage valve by means of a relatively small volume passageway. The port control member of the first stage valve includes a feedback path leading from the output port of the first stage valve to a feedback chamber located at the end of the port control member that is opposite the end which receives the pilot applied force. The second stage valve includes a feedback path which communicates the brake port of the second stage valve with a feedback chamber located at the end of the port control member which is opposite the end of such member which is subjected to the control pressure from the first stage valve.

When the brake is off, the pressure ports of both valves are blocked, the output port of the first stage valve is connected to return, and the brake port of the second stage valve is connected to return.

When the brakes are to be applied, the pilot depresses the foot pedal, causing the port control member of the first stage valve to move in a direction closing the return port and communicating the pressure port with the outlet port. The feedback response at the foot pedal is extremely fast because the fluid volume of the control chamber at the control end of the valve port control member of the second stage valve, and the passageway between such chamber and the output port of the first stage valve, is quite small. This means that for any applied force by the pilot the pedal reaction will be proportional and rapid regardless of the downstream activity. This will prevent the pilot from overdeflecting the valve which typically causes the jerky airplane stopping response.

Meanwhile, the port control member of the second stage valve is shifted in position to close the return port and connect the pressure port to the brake port. As brake pressure rises, a feedback force is developed in the feedback chamber of the second stage valve and this force acts to re-center the valve port control member to a pressure holding null condition.

Due to the closed loop nature of this valve system, it can be designed to have and deliver a high flow capability without the danger of overshooting the intended brake pressure (as commanded by the pilot applied force to the valve port control member of the first stage valve).

In order to release the brakes, the pilot releases his pedal force which causes the first stage to displace towards the return port. This results in an immediate decrease of control pressure. As the control pressure decreases, the feedback pressure in the second stage valve causes the port control member of the second stage valve to move towards its off position. This connects the brake port to return and decrease the brake pressure as required, to satisfy the decreased pedal load.

The combination of these two valves allows the pilot to command a given brake force by means of his pedal load without concerns for the possibility of inadvertently developing an excessive amount of brake pressure or without having to cautiously apply the brakes with the attendant slow response.

Specifically, the two stage valve system of the present invention has the following advantages over the conventional single stage metering valve system:

(1) Brake pressure levels are established automatically in direct response to the pedal force applied by the pilot. The pilot does not need to anticipate the point where the brakes will fill in order to establish the intended brake pressure. This is now performed automatically.

(2) Brake pedal feedback reactions are virtually instantaneous in a response.

(3) Brake pressure levels are established more rapidly than with the conventional system and without danger of the pressure overshooting the intended value. The delay that is typical for the original system when low brake pressures are applied is eliminated by the use of the system of this invention.

BRIEF DESCRIPTION OF THE DRAWINGS

Like reference numerals are used to designate like parts throughout the several views of the drawings, and:

FIG. 5 is a view of the metering valve portion of the system shown by FIG. 4, at the start of braking; and FIG. 6 is a view like FIG. 5, but showing a null position for each valve stage.

BEST MODE FOR CARRYING OUT THE INVENTION

Figure 1:
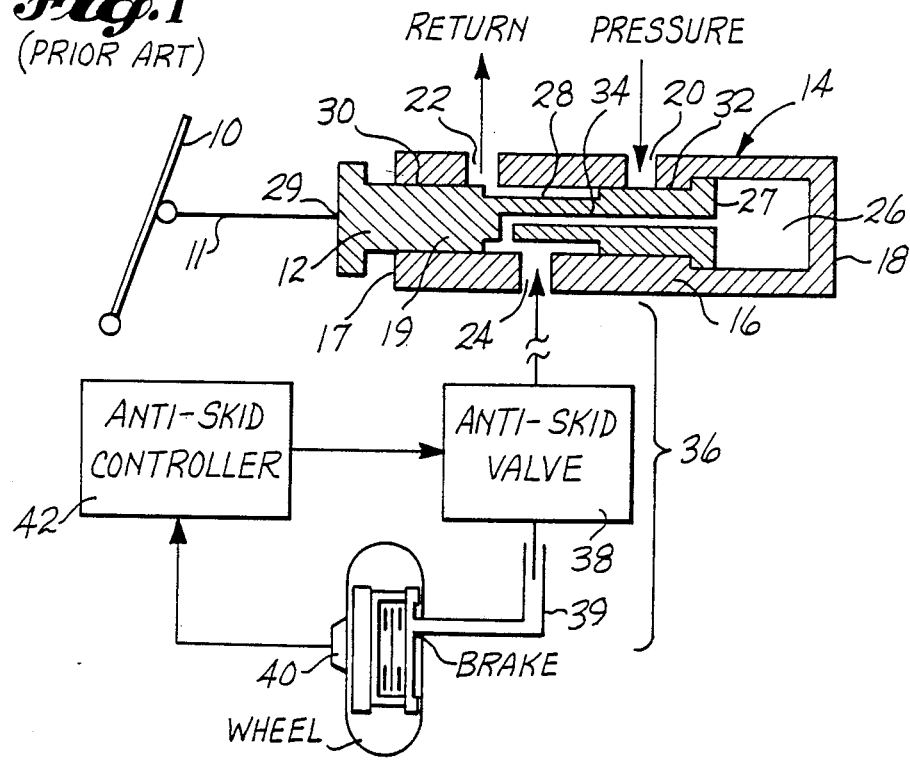
FIG. 1 is a schematic view of a conventional brake control system for an aircraft wheel brake, utilizing a single stage valve which meters both the flow and pressure, shown in its off position.

Referring to FIG. 1, a foot pedal 10 is shown to be operatively connected to a valve port control member 12 of a first stage metering valve 14. The connection between the pedal 10 and the port control member 12 would typically consist of a system of control cables, cable guides and mechanical linkages.

Valve 14 includes a housing 16 having an open end 17 and a closed end 18. Housing 16 includes a chamber 19 in which the port control member 12 is received. Housing 16 includes a pressure port 20, a return port 22 and an output port 24. A feedback chamber 26 is defined within the closed end portion of housing 16, outwardly of the end 27 of port control member 12 which is opposite the end 29 which receives the pilot applied force.

Port control member 12 includes an annular galley region 28 between two axially spaced apart lands 30, 32. A passageway 34, hereinafter referred to as the feedback passageway 34, extends between the galley 28 and a port in the end 27 of member 12.

In this type of system, there is a considerable volume of conduit and brake system components, including wheel cylinders, in the region designated 36, which must be filled by fluid delivered through the valve 14 before any brake torque is generated.

The presence of an anti-skid system is shown but such system will not be described in detail because it is not a part of the present invention. It is sufficient to say that typical anti-skid system includes an anti-skid valve 38 in the brake line 39, a wheel speed transducer 40 and an anti-skid controller 42. If the wheel speed response characteristics measured by the wheel speed transducer 40 indicates that there is an adverse amount of wheel skidding due to excessive brake pressure, the controller 42 will send a signal to the anti-skid valve 38 sufficient to cause it to function and reduce the brake pressure until proper wheel speed response is regained.

Figure 2:
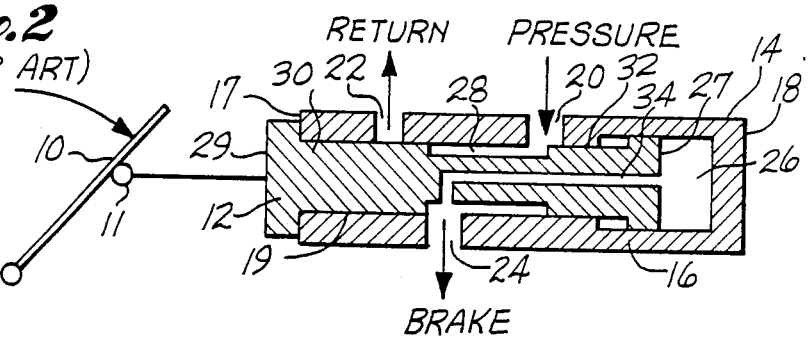
FIG. 2 is a view of the metering valve portion of FIG. 1 at the start of braking, while pressure and flow are being delivered through the valve into the conduits and brake components downstream of the metering valve.

Referring to FIG. 2, in the conventional system, when it is desired to apply the brakes, the pilot exerts a foot pressure on the pedal 10. A force is created which is transmitted by the cable and linkage system (shown schematically at 11) to the valve port control member 12. Specifically, this force moves land 30 of the member 12 into a position blocking (first partial and then total) the return port 22 and communicates the galley 28 with the pressure port 20. This results in pressure port 20 being connected via the galley 28 to the brake port 24, and results in a flow of fluid into the volume of conduit and brake components which are located in region 36 downstream of the port 24.

Figure 3:
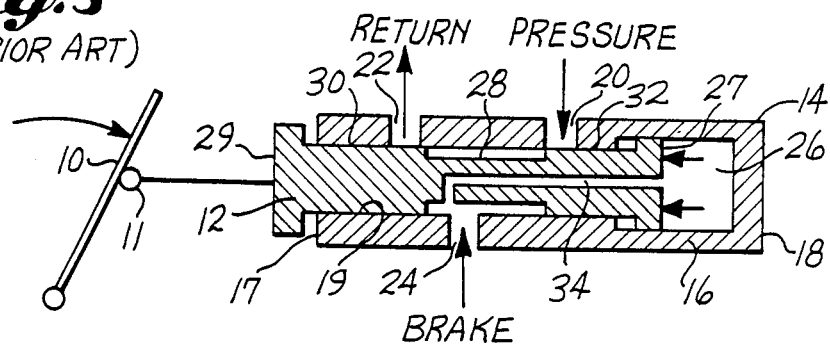
FIG. 3 is a view like FIG. 2, but illustrating a null or no flow condition.

As should be evident, flow through the valve 14 is proportional to the displacement of member 12. As previously explained, when the conduits and brake components become filled, a pressure is developed at the port 24 which is fed via passageway 34 to the feedback chamber 26. The pressure in chamber 26 acts on the end surface 27 of the member 12 in opposition to the pilot applied force, and moves the member 12 to a null position in which pressure port 20 and return port 22 are both closed (FIG. 3). As previously mentioned, to release the brakes, the pilot simply relaxes the applied force on the pedal 10. In response, the pressure in the feedback chamber 26 moves the control member 12 into an extended position (FIG. 1), closing the pressure port 20 and communicating the brake port 24 with the return port 22, via valley 28. At the same time, feedback chamber 26 is connected to return pressure via feedback passageway 34, valley 28 and return port 22.

Figure 4:
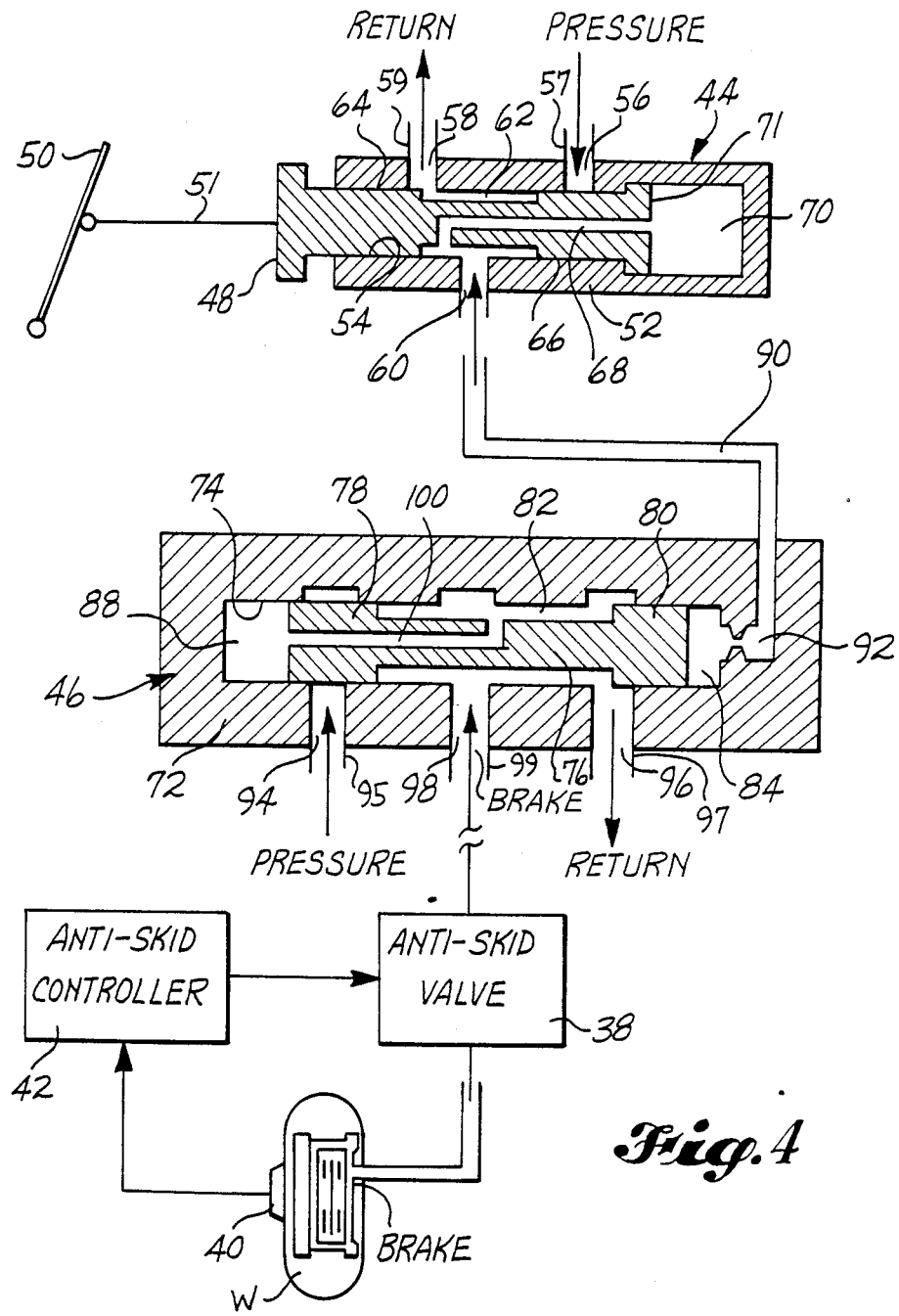
FIG. 4 is a schematic view of a two stage metering valve system constructed in accordance with the present invention, shown in its off position.

Referring to FIGS. 4-6, the brake control system of the present invention includes a first stage metering valve 44 and a second stage metering valve 46, each of which is shown in schematic form.

The first stage valve 44 is shown to be identical in construction to the metering valve 14 of the conventional system (FIGS. 1-3) but its function is different.

As in the conventional system, valve 44 includes a port control member 48 which is connected by cables, linkage, etc. (shown schematically at 51) to a foot pedal 50. The valve housing 52 includes an inner chamber 43 in which the port control member 48 is received. It further includes a pressure port 56, a return port 58 and an output port 60. An annular galley 62 is located between lands 64, 66. A feedback passageway 68 connects galley 62 with feedback chamber 70. The pressure in chamber 70 acts on feedback area 71, applying an endwise force on port control member 48 opposite to the pilot applied pedal force.

The second stage valve 46 comprises a housing 72 which is shown in schematic form. Valves 44, 46 may have separate housings or may occupy separate regions in a single housing. It makes no difference. Herein the terms "first housing means" and "second housing means" are used to describe the housing regions immediately around the two stages of the valve assembly. These regions may in a given installation be parts of a single housing or be separate housings.

The housing 72 includes a chamber 74 which is closed at both ends. A port control member 76 is movable axially in the chamber 74. Member 76 includes a pair of spaced apart lands 78, 80 between which is located an annular galley 82. A control pressure chamber 84 is provided at a first end of the member 76. A feedback chamber 88 is provided at the opposite or second end of member 76. A passageway 90 connects output port 60 of valve 44 with the control pressure chamber 84. Passageway 90 includes a flow control orifice 92.

Housing 72 includes a pressure port 94, a return port 96 and a brake port 98. Member 76 includes a feedback passageway 100 which extends between galley 82 and feedback chamber 88.

Pressure port 94 is connected to a source of pressure by a conduit means or passageway 95. Return port 96 is connected to return pressure by a conduit means or passageway 97. Brake port 98 is connected to a conduit means or passageway 99 which leads to the brake cylinder.

Pressure port 56 of valve 44 is also connected to a source of pressure by a conduit means or passageway 57. Return port 58 is connected to return pressure by a conduit means or passageway 59. As previously mentioned, output port 60 is connected to the conduit means or passageway 90 which leads to the control pressure chamber 84.

FIG. 4 shows the positions of the valves 44, 46 when no brake force is being applied by the pilot onto the pedal 50. In valve 44, land 66 of member 48 closes pressure port 56. Galley 62 connects output port 60 with return port 58. In valve 46, land 78 of member 76 closes pressure port 94. Brake port 98 is connected to return port 96 via galley 82.

Referring to FIG. 5, when a braking force is applied by the pilot to the brake pedal 50, this force is transmitted by the cables, linkage, etc. (51) to the port control member 48, moving such member inwardly. Land 64 first closes return port 58 and then upon an additional movement of member 48 pressure port 56 becomes partially opened and is communciated via galley 62 to output port 60. At that time the passageway 90 and the control pressure chamber 84 are substantially full of fluid, and so almost instantaneously a pressure is developed in chamber 84, acting to move port control member 78 to the left, and also acting to develop a feedback pressure which is delivered via feedback passage 68 back to the feedback chamber 70 of valve 44. The initial movement of port control member 76 first moves land 80 into a return port (96) blocking position. Then, pressure port 94 is progressively opened and put into communication with brake port 98 via galley 82. Supply pressure from port 94 is delivered into the portion of the brake system downstream of brake port 98 without any rise in pressure in the feedback chamber 88 until the conduits and components downstream of port 98 become full. Thereafter, a pressure build-up occurs which is fed via galley 82 and feedback passageway 100 to feedback chamber 88. The pressure build-up within the feedback chamber 88 acts on the near or second end of member 76 and moves the member 76 to the right (as pictured) into a null position (FIG. 6).

Comparing the conventional system (FIGS. 1-3) with the system of the present invention (FIGS. 4-6), in operation of the system of the invention, the pedal force applied by the pilot is transmitted to the port control member 48, as before. However, in the system of the invention, instead of brake pressure acting on the pressure feedback area 71, this pressure now becomes the control pressure for the second stage valve. Since the fluid volume associated with the control pressure is very small compared to the brake pressure volume in the conventional system, the pressure response in the new system is extremely fast. As previously stated, this means that for any applied force by the pilot on the pedal there will be a pedal reaction force that is proportional and rapid regardless of the activity downstream of valve 46. In the system of the invention, the flow through valve 44 is extremely small. Valve 44 in effect modulates pressure rather than controlling any appreciable flow.

The rapid response felt by the pilot at the pedal 50 prevents the pilot from overdeflecting the valve 44 and as a result the tendency for a jerky airplane stopping response is essentially avoided.

Foot pressure on pedal 50 determines the pressure level of the control pressure in chamber 84 acting on port control member 76. The member 76 moves to the left (as pictured) according to the unbalance between the control pressure in chamber 84 and the second stage feedback pressure in chamber 88. As previously mentioned, movement of member 76 to the left (as pictured) meters flow from pressure port 94 to the brake line connected to brake port 98. As the brake pressure rises the feedback force acting on the second end of member 76 increases and the member 76 is shifted in position to the right (as pictured) into a pressure holding null condition. Due to the closed loop nature of valve 46, such valve 46 can be designed to have a high flow delivering capability without the danger of overshooting the intended brake pressure.

In order to release the brakes, the pilot need only relax his force on brake pedal 50, as in the conventional system. This relaxing of the pedal force causes the port control member 64 to be moved to the left under influence of the feedback pressure in chamber 70 acting on pressure face 71. Such movement of member 64 decreases the control pressure in 84 allowing the feedback pressure in chamber 88 to move valve member 76 to the right (as pictured). This results in a decrease of brake pressure in an amount proportional to the decrease in load on the pedal 50.

The use of the two valves 44, 46 in combination, in the manner shown and described, allows the pilot to command a given brake force by means of a pedal load without having to be concerned with the possibility of inadvertently commanding an excessive amount of brake pressure, or without having to cautiously apply the brakes with an attendant slow response. Brake pressure levels are established automatically in direct response to the pedal force applied by the pilot. The pilot does not have to anticipate the point where the brakes will fill in order to establish the intended brake pressure; this is now performed automatically. Brake pedal feedback reactions are virtually instantaneous in response. Brake pressure levels are established more rapidly than with the conventional system and without danger of the pressure overshooting the intended value. The delay that is typical in the conventional system when low brake pressures are applied is eliminated in the system of the invention.

As will be understood by a person skilled in the art, the details of construction of the various valves can vary. As previously mentioned, two separate valve units can be provided, each with its own housing, or the two valves can be constructed within a single housing. The first stage valve 44 of the illustrated embodiment is structurally identical to the metering valve 14 in the conventional system, but in the system of this invention it performs a modified function. The second stage valve 46 is structurally like the hydraulic second stage of the model 37-231 anti-skid valve manufactured by the HydroAire Division of the Crane Company, of Burbank, California and in use today in some commercial aircraft.

As will be recognized, the conduit leading from the brake port 98 will most likely branch out and extend to a plurality of wheel brakes.

It is to be understood that the system that is illustrated in the drawing and described above is merely to serve as an example of the invention. The scope and content of the invention are to be determined by the claims which follow, interpreted by the established laws of claim interpretation, including the doctrine of equivalents.

What is claimed is:

1. In an aircraft wheel brake controlling system:

An aircraft wheel brake including fluid operated brake applying means;

a first stage metering valve comprising:

first housing means defining a first axial chamber having a closed end, an end opening, a pressure port, a return port and an output port;

a first valve port control member within said chamber, including a control portion which projects outwardly from said chamber through said end opening;

said first valve port control member being movable axially within said chamber between an extended position and a depressed position;

said first valve port control member blocking the pressure port and connecting the output port to the return port when extended;

said first valve port control member blocking the return port and connecting the pressure port to the output port when depressed; and said first valve port control member functioning to meter flow from the pressure port to the output port in proportion to its displacement between its extended and depressed positions;

pilot operable foot pedal means connected to the control portion of said first valve port control member, for depressing the first valve port control member in an amount proportional to the amount of pilot applied force on the foot pedal means;

a feedback chamber in said first housing means at the end of the first valve spool opposite the control portion of the first valve spool; and feedback passageway means for delivering pressure from the output port of the first metering valve to said feedback chamber;

a second stage metering valve comprising:

second housing means defining a second axial chamber having first and second closed ends, a pressure port, a return port and a brake port;

a second valve port control member in said second axial chamber, movable axially within said second axial chamber between first and second positions;

said second valve port control member blocking the pressure port and connecting the brake port to the return port when in its first position;

said second valve port control member blocking the return port and connecting the pressure port to the brake port when in its second position; and said second valve port control member functioning to meter flow from the pressure port to the brake port in proportion to its displacement between its first and second positions;

first conduit means connecting the pressure port of the first metering valve to a supply pressure;

second conduit means connecting the return port of the first metering valve to a return pressure;

third conduit means connecting the pressure port of the first metering valve to the first end of the second axial chamber;

fourth conduit means connecting the pressure port of the second metering valve to a supply pressure;

fifth conduit means connecting the return port of the second metering valve to a return pressure;

sixth conduit means connecting the brake port of the second metering valve to a fluid operated brake applying means of the aircraft wheel brake; and feedback passageway means connecting the brake port to the second end of the second axial chamber.

2. An aircraft wheel brake controlling system according to claim 1, comprising a pressure control orifice in the third conduit means.

3. An aircraft wheel brake controlling system according to claim 1, wherein the third conduit means is a closed chamber and during use is substantially full of fluid, so that very little flow through the first stage metering valve is necessary in order to develop a feedback pressure at the output port of the first metering valve.

4. An aircraft wheel brake controlling system according to claim 1, wherein the first stage metering valve and the second stage metering valve are in close proximity and the third conduit means is relatively short and its volume is relatively small, and wherein in use it is always substantially full of fluid, so that very little fluid flow through the first stage metering valve is necessary in order to create a feedback pressure in the feedback chamber of the first stage metering valve.

5. An aircraft wheel brake controlling system, comprising:

a first stage metering valve including a pressure port, a return port, an output port and a port control member;

a foot pedal control, operable by the pilot, and including means connecting it to the port control member such that when the foot pedal is depressed by the pilot a force will be exerted on the port control member, for urging it in a first direction in an amount proportional to pilot applied force on the foot pedal control;

said first stage metering valve including feedback means operable by a feedback pressure from the output port of the valve to exert a force on the port control member opposite to the foot pedal applied force;

a second stage metering valve including a pressure port, a return port, a brake port, a second port control member and a control pressure chamber;

passageway means connecting the output port of the first stage metering valve with said control pressure chamber, for delivering fluid pressure into said chamber and against a portion of the second valve port control member, for urging it in a first direction;

said second stage metering valve including a feedback chamber and a feedback passageway connecting said feedback chamber with the brake port of the second stage metering valve;

said feedback chamber being arranged to exert a feedback force on the second port control member in a direction opposite to the control pressure force;

an aircraft wheel brake including fluid operated brake applying means;

conduit means connecting the brake port of the second stage metering valve with the fluid operated brake applying means;

means connecting the pressure ports of the two valves to a supply pressure and the return ports to a return pressure;

said first stage metering valve having an off position in which there is essentially no force on the foot pedal, the pressure port of the first stage metering valve is closed and the output port of the first stage metering valve is connected to return; and said second stage metering valve having an off position in which the pressure port is closed and the brake port is connected to the return port.

6. An aircraft wheel brake controlling system according to claim 5, wherein the passageway means connecting the output port of the first stage metering valve with the control pressure chamber of the second stage metering valve is a closed chamber and during use is substantially full of fluid, so that very little flow through the first stage metering valve is necessary in order to develop of feedback pressure at the output port of the first metering valve.

7. An aircraft wheel brake controlling system according to claim 5, wherein the first stage metering valve and the second stage metering valve are in close proximity to each other and the passageway means connecting the output port of the first stage valve with the pressure chamber of the second stage valve is relatively small in volume and during use is essentially full of fluid, so that very little fluid flow through the first stage metering valve is necessary in order to develop a feedback pressure at the output port of the first stage metering valve.

8. A method of controlling hydraulic wheel brakes to make braking action more sensitive to pilot control and provide a smooth stopping response to foot pedal movement by the pilot, comprising:

using a foot pedal developed force to displace a first port control member of a first stage metering valve, by an amount proportional to pilot applied force on the foot pedal, for metering pressure through said valve from a supply pressure to one end of a port control member of a second stage metering valve; and using the output pressure of the first stage metering valve to move the port control member of the second stage metering valve, for metering flow and pressure through the second stage metering valve, from a supply pressure source to a brake applying device at the aircraft wheel;

using feedback pressure from the output of the second stage metering valve to move the second port control member into a null position, and using a feedback pressure developed between the first and second stage metering valves to move the first port control member to a null position.

9. A method according to claim 8, comprising using a closed passageway between the output of the first stage metering valve and an end of the port control member of the second stage metering valve, and maintaining such passageway substantially full of fluid, so that only a small amount of fluid flow through the first stage metering valve is necessary in order to develop a force acting on the port control member of the second stage metering valve.

* * * * *

UNITED STATES PATENT AND TRADEMARK OFFICE
CERTIFICATE OF CORRECTION

PATENT NO. : 4,685,748
DATED : August 11, 1987
INVENTOR(S) : Melvin C. Zoerb It is certified that error appears in the above-identified patent and that said Letters Patent are hereby corrected as shown below:

Column 2, line 8, "feed" should be -- feel --.

Column 4, line 63, after "that", insert -- a --.

Column 5, line 46, "inner chamber 43" should be -- inner chamber 54 --.

Claim 1, column 9, line 3, "pressure" should be -- output --.

Claim 1, column 9, line 11, "a" should be -- the --.

Claim 6, column 10, line 24, "of" should be -- a --.

Signed and Sealed this

First Day of March, 1988

Attest:

DONALD J. QUIGG

Attesting Officer

Commissioner of Patents and Trademarks